(12) United States Patent
McDermott et al.

(10) Patent No.: US 9,539,670 B2
(45) Date of Patent: Jan. 10, 2017

(54) JOINT FOR TUBULAR MATERIALS

(75) Inventors: Bernard McDermott, Co Mayo (IE); Adam Szczepanski, Galway (IE)

(73) Assignee: Creganna-Tactx Medical, Galway (IE)

( * ) Notice: Subject to any disclaimer, the term of this patent is extended or adjusted under 35 U.S.C. 154(b) by 626 days.

(21) Appl. No.: 13/114,545

(22) Filed: May 24, 2011

(65) Prior Publication Data

US 2011/0291407 A1    Dec. 1, 2011

Related U.S. Application Data

(60) Provisional application No. 61/348,061, filed on May 25, 2010.

(51) Int. Cl.
| | |
|---|---|
| F16L 35/00 | (2006.01) |
| B23K 33/00 | (2006.01) |
| B23K 31/02 | (2006.01) |
| F16D 1/027 | (2006.01) |
| F16L 13/007 | (2006.01) |
| F16B 3/00 | (2006.01) |

(52) U.S. Cl.
CPC ........... *B23K 33/006* (2013.01); *B23K 31/027* (2013.01); *F16D 1/027* (2013.01); *F16L 13/007* (2013.01); *B23K 2201/06* (2013.01); *B23K 2203/24* (2013.01); *F16B 3/00* (2013.01)

(58) Field of Classification Search
CPC . B23K 33/006; B23K 31/027; B23K 2203/24; B23K 2201/06; F16D 1/027; F16L 13/007; F16B 3/00
USPC .......... 285/288.1–288.9, 330, 329, 903, 328, 285/422, 285.1, 286.1, 319; 403/270–272, 403/339, 340, 364; 464/57–60, 51; 439/874, 210, 736; 606/263; 228/138, 228/249–251, 151, 153; 138/120, 155, 138/168, 171; 174/74 R, 84 R, 94 R; 156/304.2; 140/111, 112; 29/868, 869; 254/134.3 R, 134.3 CL, 134.3 FT, 902
See application file for complete search history.

(56) References Cited

U.S. PATENT DOCUMENTS

| | | | | |
|---|---|---|---|---|
| 1,619,346 | A | * | 3/1927 | Houston et al. ................ 267/47 |
| 1,982,183 | A | * | 11/1934 | Tarbox .......................... 403/331 |
| 3,469,865 | A | * | 9/1969 | Ellenburg ..................... 285/330 |
| 5,853,375 | A | | 12/1998 | Orr |
| 5,967,855 | A | * | 10/1999 | Asakura et al. ............. 439/681 |
| 6,352,385 | B1 | | 3/2002 | Wojciechowski |
| 6,557,908 | B2 | * | 5/2003 | Houtschilt et al. .......... 285/420 |

(Continued)

FOREIGN PATENT DOCUMENTS

DE    10 2006 035191 A1    1/2008

OTHER PUBLICATIONS

Ming H. Wu, Fabrication of Nitinol Materials and Components, Proceedings of the International Conference on Shape Memory and Superelastic Technologies, Kunming, China, p. 285-292 (2001).

*Primary Examiner* — James Hewitt
*Assistant Examiner* — Jay R Ripley
(74) *Attorney, Agent, or Firm* — Schiff Hardin LLP

(57) ABSTRACT

An end-to-end tubular joint includes first locking pieces cut from the first tube and second locking pieces cut from the second tube, where the cuts have radial cut faces on the axially aligned cuts. The first and second locking pieces are interlocked with lateral extensions of the respective locking pieces bearing against one another and the radial cut surfaces distributed circumferentially around the joint so as to constrain relative movement between the parts. The first locking pieces are welded to the first tube and the second locking pieces are welded to the second tube to form a tube joint. An alternative forms cutouts in the first tube and fits locking pieces into the cutouts that are welded to a second (Continued)

member, such as a second tube or cylinder that fits into the first tube so as to form the tube joint.

12 Claims, 7 Drawing Sheets

(56) References Cited

U.S. PATENT DOCUMENTS

| | | |
|---|---|---|
| 7,503,931 B2 * | 3/2009 | Kowalsky et al. .......... 623/2.36 |
| 2003/0028127 A1 | 2/2003 | Balzum |
| 2003/0171806 A1 * | 9/2003 | Mathis et al. ............... 623/2.36 |
| 2006/0006649 A1 | 1/2006 | Galdonik et al. |

* cited by examiner

JOINT FOR TUBULAR MATERIALS

CROSS-REFERENCE TO RELATED APPLICATION

This application claims the benefit of U.S. Provisional Patent Application Ser. No. 61/348,061, filed May 25, 2010, which is incorporated herein by reference.

BACKGROUND OF THE INVENTION

Field of the Invention

The present invention relates generally to method and apparatus for joining tubular materials to one another and to a method and apparatus for joining members formed of dissimilar materials to one another.

Description of the Related Art

Tubes are used in a variety of fields and for a variety of purposes. For instance, tubular members are used in the medical field in medical devices. One application of tubular members is as a component of a system for delivery of medical devices to locations within the human body such as within any lumen of the body. For example, the tubes may be used to deliver medical devices within the vasculature, the biliary system, the esophagus or the gastro-intestinal tract. Of course, tubes are used in many other fields and for many other purposes as well.

It is sometimes necessary to join two tubes to one another and in some applications it is important that the joining of the tubes not result in an increase in the outside diameter of the tubes at the joint and that the joining not result in a decrease in the inside diameter of the tubes at the joint. Where tubes to be joined are of a similar material, it may be possible to join the tubes by welding using a so-called butt joint. Where dissimilar materials are to be joined, the materials may not be readily weldable to one another. Some tube materials may be joined by gluing, brazing or soldering of the butt joint; however, it may be problematic to join dissimilar materials even with these techniques and the fact that only a small bonding surface area is available at the joint can result in a joint that is not sufficiently strong.

A lap joint increases the joint strength by increasing the bonding surface area but increases the wall thickness at the joint. A half lap joint where the material thickness of both parts is reduced in the joint area, resulting in a larger bonding area with no increase in the wall thickness at the joint, may not be practical for thin wall tubes. Lap joints between dissimilar tubular materials can be weak or require substantial overlap areas to achieve adequate bond strengths.

Other techniques for joining tubes to one another are possible, such as press fit, shrink fit, crimping, or the like, but these result in either an increased outer diameter, a decreased inner diameter, or both. Other joining techniques may also result in deformation of the tube, weakening of the tube, or other issues.

Joining dissimilar materials in general can also be troublesome, such as when it is necessary to join a tube to another member such as a tube or a cable, particularly where the tube and other member are of different materials. For instance, welding of nitinol to stainless steel results in brittle intermetallic compounds, such as TiFe and $TiFe_2$, which makes the resulting weld brittle. Using an intermediate material to avoid the formation of such brittle compounds is not practical in all applications.

Thus, joining tubes of dissimilar materials can be problematic if the materials are not readily weldable to each other nor reliably joined by other means such as brazing, soldering, gluing, press fit or shrink fit. This is particularly true where it is desired to create a joint connecting tubes or other members without an increase to the outside dimensions of the tube and without decreasing the inside dimensions of the tube.

SUMMARY OF THE INVENTION

The present invention provides a method and apparatus that allows tubes to be joined to one another in end-to-end connection without increasing the outer diameter (OD) of the tubes and without decreasing the inner diameter (ID) of the tubes. In other words, the materials are joined without increasing the wall thickness at the joint. The present method and apparatus is particularly well suited to joining relatively thick wall tubes to one another as well as for joining tubes of different materials that have different material characteristics to one another, such as where those materials are not readily welded to one another. An example of the different materials that may be joined using the present method is joining a stainless steel tube to a nitinol tube.

By cutting the tubular materials with radial cuts using a tube cutting laser system or other method, the tubular pieces can be arranged in various interlocking patterns so that the cut faces of the pieces restrain movement between different pieces in different directions. By cutting interlocking pieces of different tubular materials, by arranging the pieces in an interlocking arrangement and by welding or attaching only similar materials to one another, the different tubes can be joined to one another without the requirement to weld tubes of different materials to one another.

The method may also be used to provide a lap joint to join a tube or tool or other device of generally tubular shape to a member such as a cylindrical member, for example, a cable or wire, that may be of a different material than the tube. One or more pieces is cut from the tube and replaced by an interlocking piece that is securely fastenable to the cylindrical member. The cylindrical member may be hollow or solid.

The interlocked pieces are formed by cutting the tubes with radial cuts to make locking pieces which can be assembled to join the tubes together. The assembled pieces are fixed in place by welding or other attachment methods of the locking pieces to the body of the tubes of the same material. The present method avoids the need to weld or otherwise attach dissimilar materials to one another or to add structures to or otherwise modify the joined tubes in a way that would change the inside diameter or the outside diameter and avoids as well crimping or otherwise deforming the tubes to effect the joining.

DETAILED DESCRIPTION OF THE PREFERRED EMBODIMENTS

Figure 1:
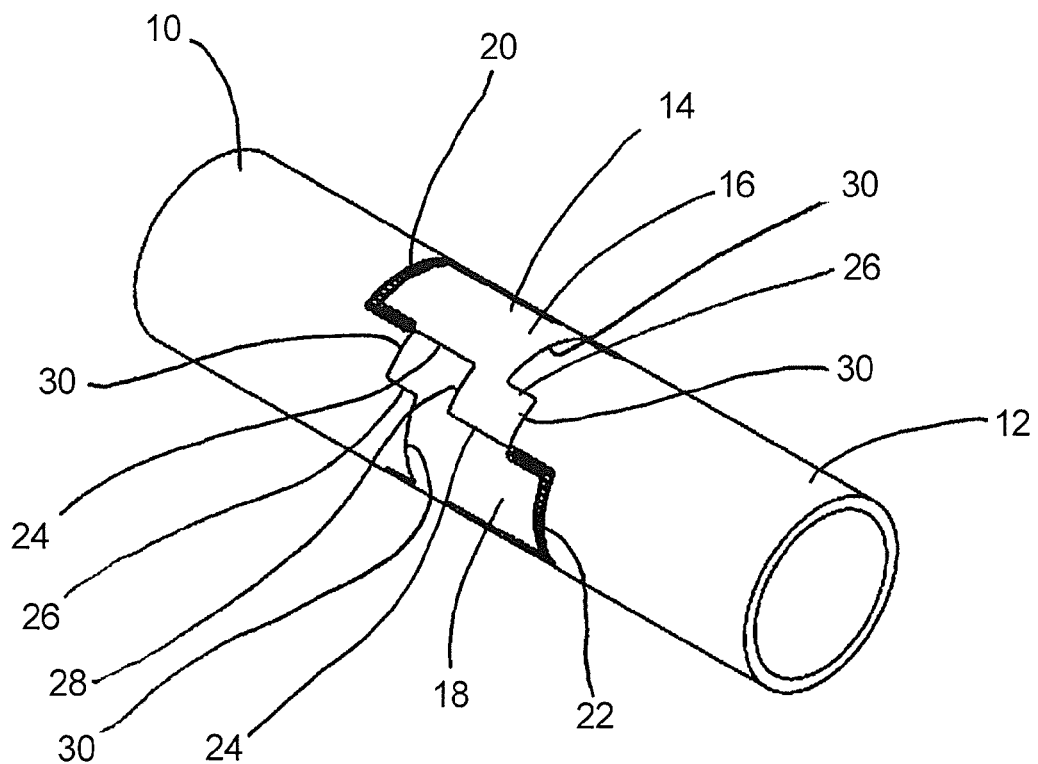
FIG. 1 is a side perspective view of two tubes joined end-to-end using interlocking pieces according to the principles of the present invention.

Referring to FIG. 1 of the drawings, a first tube 10 is joined in end-to-end relation with a second tube 12. The tubes 10 and 12 are connected at a tube joint 14 that includes a first locking piece 16 of the same material as the first tube 10 or of a material readily welded to the first tube 10 and a second locking piece 18 of the same material as the second tube 12 or of a material readily welded to the second tube 12. The locking pieces 16 and 18 are shaped to interlock with one another without requiring welding, brazing, soldering, gluing or other additional fastening measures. The view of FIG. 1 shows only one side of the tube joint 14. Additional locking pieces are provided on the other side of the tube joint 14 that are not visible in the figure. The additional locking pieces may be of the same shape or different shapes as the locking pieces visible in FIG. 1. The illustrated tubes 10 and 12 are relatively short for purposes of illustration. The tubes may be of any desired length.

The first locking piece 16 is welded at an interface 20 to the first tube 10 where the tube 10 and locking piece 16 contact one another. The second locking piece 18 is welded at an interface 22 to the second tube 12 where the tube 12 and locking piece 18 contact one another. By welding the first locking piece 16 to the tube 10 of the same material, of a similar material, or of materials that are readily welded, a strong weld is formed at the interface 20. Similarly, the second welded interface 22 is strong as a result of the second locking piece 18 being of the same or similar material to the tube 12 or of readily welded materials. The interlocked locking pieces 16 and 18 need not be welded to one another or otherwise glued, soldered or brazed to one another, yet the interlocked pieces 16 and 18 hold the tubes 10 and 12 together at the tube joint 14. The interlocking fit between the interlocked pieces provides the fastening of the tubes together.

The interface between the interlocked pieces 16 and 18 provide surfaces that resist relative axial and rotational motion between the pieces. Relative rotational motion between the tubes 10 and 12 is prevented or restricted by axially extending interface surfaces 24 between the interlocking pieces 16 and 18 as well as by axially extending interface surfaces 26 between the locking pieces 16 or 18 and the tubes 10 or 12. Relative axial motion between the tubes 10 and 12 in a tension or pulling direction is prevented or restricted by transversely extending interface surfaces 28 between the locking pieces 16 and 18. The locking pieces 16 and 18 are prevented from pulling out of position in their respective tubes 10 and 12 by the weld seams 20 and 22. Relative axial motion between the tubes 10 and 12 in a compressing or pushing direction is prevented or restricted by transversely extending interface surfaces 30 between the first locking piece 16 and the second tube 12 and between the second locking piece 18 and the first tube 10. Shear forces are resisted by radial surfaces at the axially extending interface surfaces 24 and 26. Bending and other forces are a combination of these forces and are therefore also resisted by the tube joint 14 by the combination of interface surfaces.

It is foreseeable and within the scope of the present invention to provide a glue, sealant, solder, coating or other material to the tube joint, for example to seal the interface surfaces if desired, although this is not necessary for the strength of the tube joint 14. The interface surfaces may be fit together tightly so as to permit no relative movement therebetween or may fit a bit more loosely so that some, albeit slight, relative movement is possible between the tubes 10 and 12.

Figure 2A:
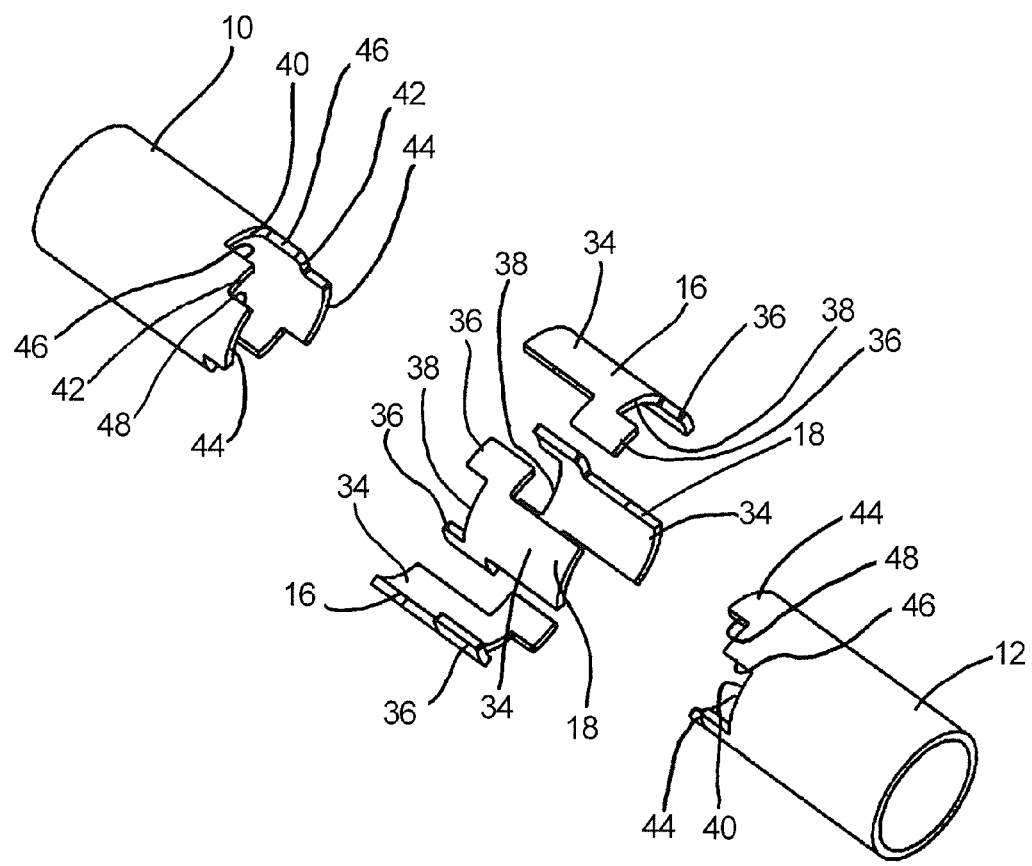
FIG. 2A is an exploded view showing the parts that are joined to form the joined tubes of FIG. 1.

In FIG. 2A, the tubes 10 and 12 and the locking pieces 16 and 18 are cut into the shapes as shown. In particular, the locking pieces each have a base portion 34 and two side extensions 36 and an end recess 38. Each locking piece 16 and 18 is of the same shape and size as the other locking pieces of the tube joint 14. Two locking pieces 16 are provided, disposed on opposite sides of the tube joint 14 from one another, and two locking pieces 18 are provided, also opposite one another. The locking pieces 16 are inverted end for end relative to the locking pieces 18 when joined to one another.

The tubes 10 and 12 each include a base recess 40, an end face 42 and a projection 44 as cut surfaces extending transverse to the tube length. The transverse cut surfaces 40, 42 and 44 are connected by axial cut surfaces 46 and 48, which form a stair-step shaped cut end on the tubes 10 and 12. The cut shapes on the ends of the tubes 10 and 12 are rotated by 90 degrees relative to one another when being joined by the tube joint 14 so that the base recess 40 of one tube is opposite the projection 44 of the other tube. Other shapes of locking pieces and tube shapes are also possible and are within the scope of the present invention. The preferred locking pieces and tube shapes have a combination of interface surfaces to resist compression forces, tension forces and rotational forces.

The cuts that form the illustrated tubes and locking pieces are performed by a laser cutting tool or other cutting tool. Preferably, a precision cutting tool is used for the cuts. The cuts are made to form interface surfaces that extend radially through the thickness of the tube material relative to the axis of the tubes. Although it is possible to use the present method and apparatus with thin walled tubes, thicker tubes have a larger interface surface at each cut and provide a more secure connection of the tubes to one another. The radially extending interface surfaces resist shear forces and other forces on the tube joint 14 and keep the tubes joined.

The locking pieces 16, two of which are shown, may be cut from the tube 10, cut from another tube of the same material, or cut from a tube of material that is readily welded to the tube 10. Similarly, the locking pieces 18, two of which are shown, may be cut from the tube 12, cut from a tube of the same material as the tube 12, or cut from a tube of a material that is readily welded to the tube 12.

Figure 2B:
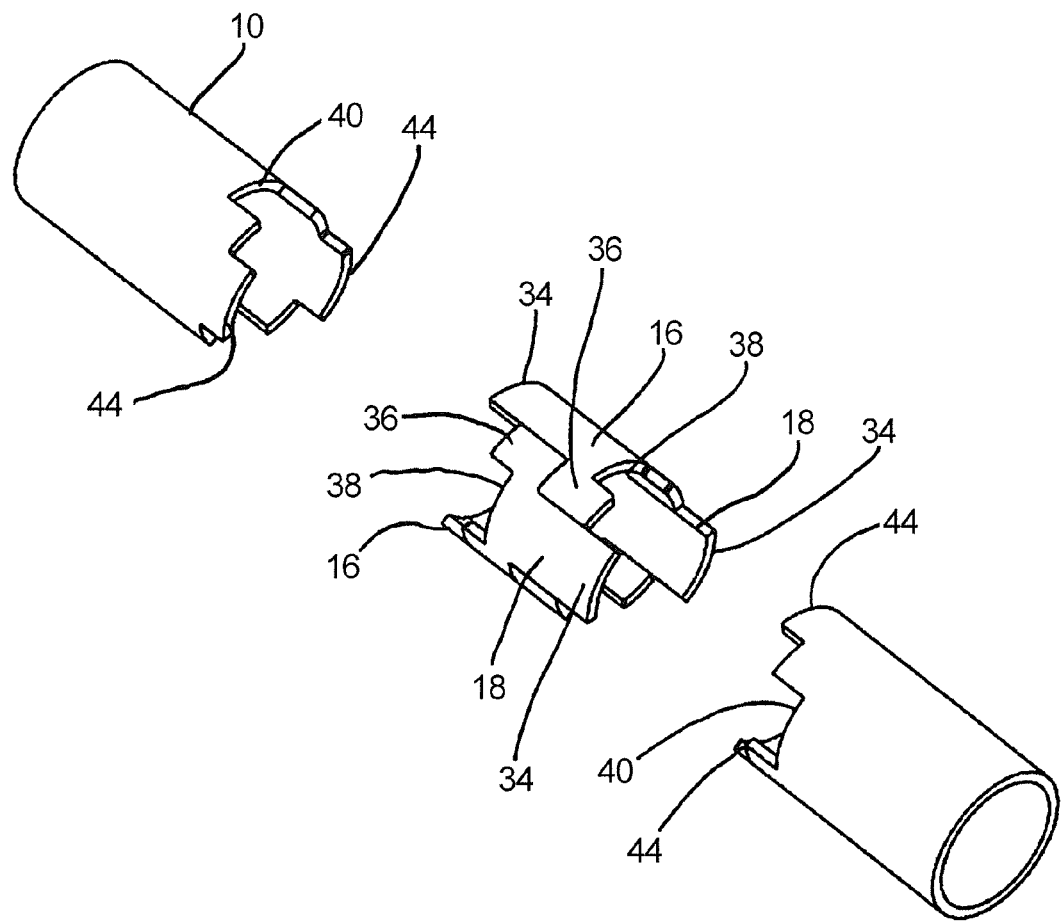
FIG. 2B is a partially assembled view showing an intermediate joining step in the joining of the tubes of FIG. 1.

FIG. 2B shows a step in the method of joining the tubes 10 and 12. The locking pieces 16 and 18 are positioned together in an interlocked configuration. The side extensions 36 of the locking pieces 16 are abutted against the base portions 34 of two adjoining locking pieces 18. Similarly, the side extensions 36 of the locking pieces 18 are abutting against the base portions 34 of two adjoining locking pieces 16. The locking pieces 16 and 18 may be of incompatible materials that are not readily welded to one another and so no welding takes place at this step in the assembly process. It may be necessary to assemble the locking pieces 16 and 18 in a form or on a mandrel or otherwise to hold them in place. It is foreseeable that a wrap, coating or fastening may be applied to the locking pieces to hold them in position, either in conjunction with a form or mandrel or instead of the form or mandrel.

Figure 3A:
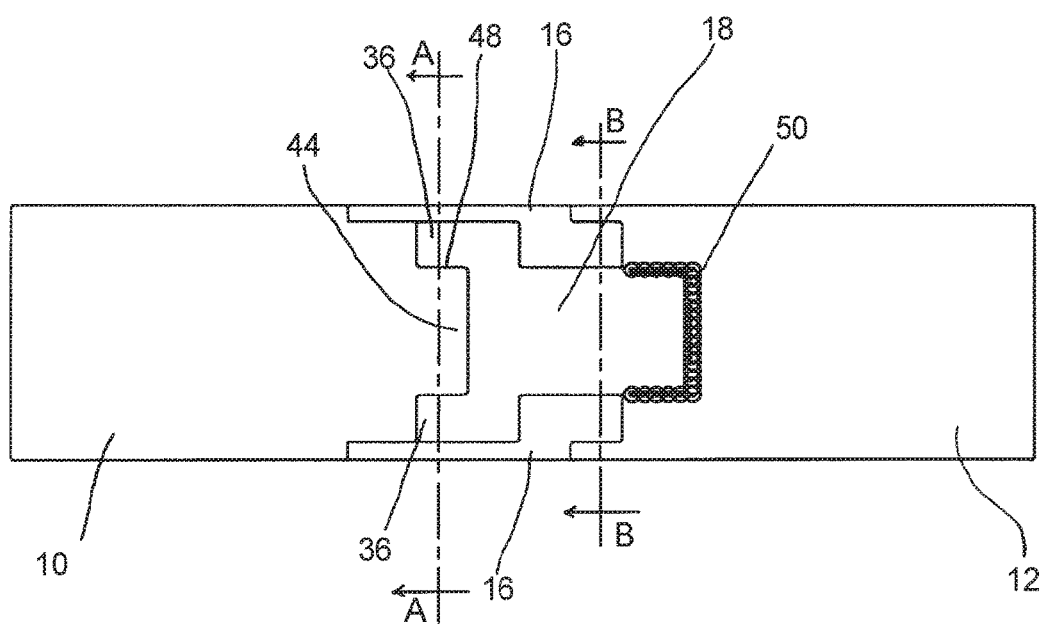
FIG. 3A is a side view of two tubes joined end-to-end indicating a location of a weld.

Turning to FIG. 3A, the interconnected locking pieces 16 and 18 have been joined by the tubes 10 and 12. Fastening of the tube joint 14 has begun by welding of the seam between the locking pieces 18 and the tube 12, as indicated at 50. The weld 50 runs along the interface surfaces 40 and 46. As a result of the weld 50, the locking piece 18 and the tube 12 are bonded to one another. A similar weld is made to join the other locking piece 18 to the tube 12 at the interface surfaces 40 and 46 on the other side of the tube 12. These welds will be referred to in the following as first welds, although the designation should not be interpreted as indicating a particular order for performing the welding steps. Welds are also made to join the tube 10 to the locking pieces 16 along the interface surfaces 40 and 46 where the base portion of the locking pieces 16 abut the tube 10. These welds are referred to as second welds, but as noted above the order in which the welds are performed is not limited by the designation.

The first welds provide a strong bond between the parts since the locking pieces 18 and the tube 12 are of the same material or of materials that are compatible for welding. The second welds are also strong since the locking pieces 16 and the tube 10 are of the same material or of materials that are compatible for welding. The first welding of the locking pieces 18 and tube 12 are carried out using welding techniques that are appropriate for the materials being welded. The second welding of the locking pieces 16 to the tube 10 is carried out with welding techniques that are appropriate for the materials of which the tube 10 and locking pieces 16 are formed. Since the material of the tube 10 may be different than the material of the tube 12, the first and second welding techniques may differ from one another. For example, it may be necessary to weld at different temperatures, at a different rate, with different equipment, with a different filler material, or other differences. The first weld and second weld may differ simply because the materials being welded in the two welds do not readily bond to one another when welded to each other.

In one example, one of the tubes is of a steel alloy and the other tube is of a nickel titanium alloy, also referred to as nitinol. Welding of the steel tube to the steel locking pieces is carried out using known steel welding techniques. Welding of the nitinol tube to the nitinol locking pieces is also carried out using known welding techniques, such as welding in an inert atmosphere using laser, TiG or resistance welding techniques. Other materials may be joined with the present method and apparatus as well.

Figure 3B:
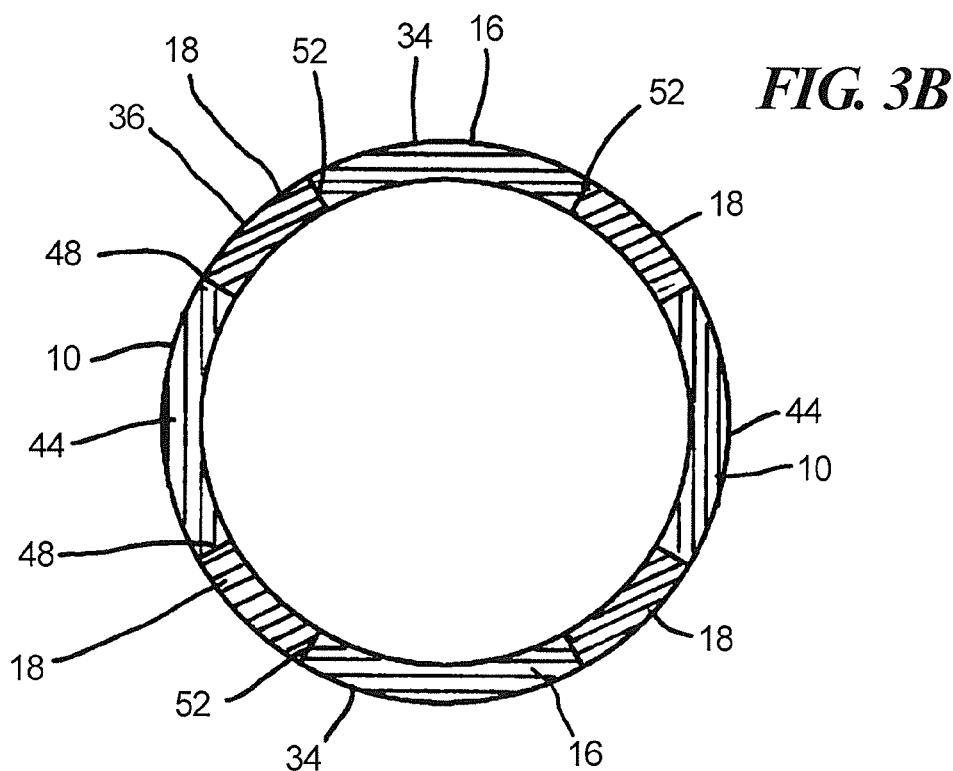
FIG. 3B is a cross-sectional view of the joined tubes along line A-A of FIG. 3A.

In FIG. 3B, the cross section through the tube joint 14 reveals the radially directed interface surfaces between the parts. The radial interface surfaces are along the axially directed cuts. For instance, the projection 44 of the tube 10 has interface surfaces 48 that abut the lateral extensions 36 of the locking piece 18. The lateral extensions 36 have interface surfaces 52 that abut the base portions 34 of the locking pieces 16. The other side is mirror symmetrical with the same arrangement of parts and interface surfaces. The locking piece 18 is not welded to the tube 10 but is constrained from moving in the x and y directions by the angles of the radial mating surfaces between it and the parts 44 and 16. The locking piece 18 cannot move radially outwards or inwards due to the angles of the radial mating surfaces between it and parts 16 and the part 44. The locking piece 18 is prevented from moving axially by the lateral shoulders and welds. A key to the method is the radial mating surfaces and how these surfaces are distributed around the circumference of the joint. The sectional views illustrate this principal. Looking at FIG. 3B, the two pieces of locking part 18 on the left hand side are actually one piece and cannot move independently, therefore they cannot move in any direction but axially, and are constrained from doing so by the lateral shoulders once welding of the parts has occurred.

Figure 3C:
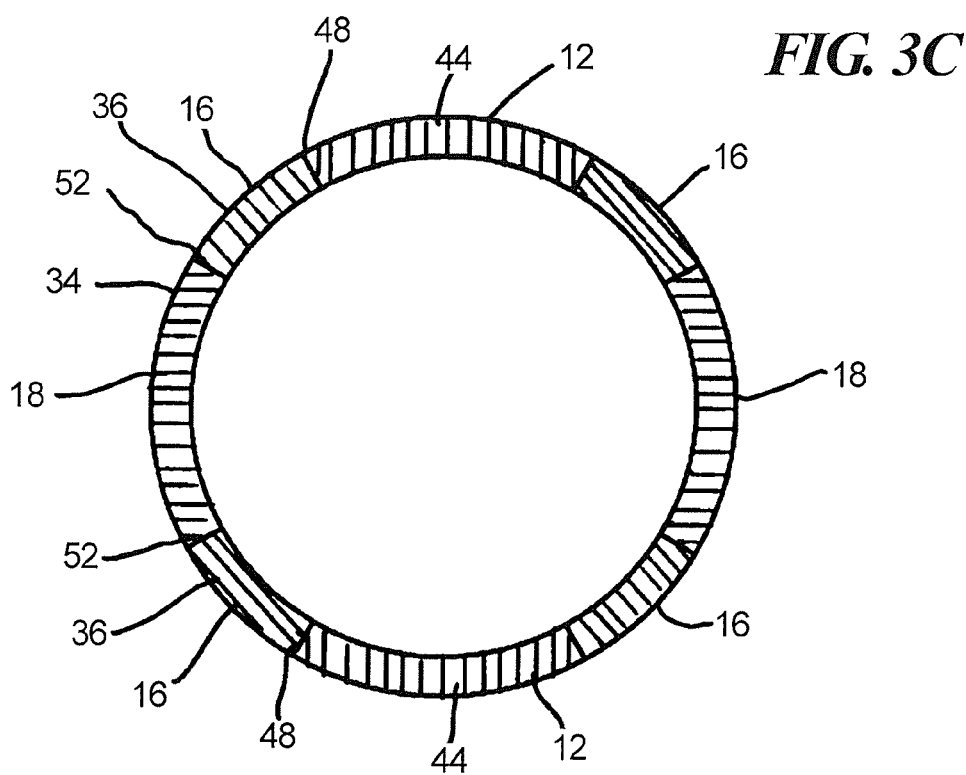
FIG. 3C is a cross-sectional view of the joined tubes along line B-B of FIG. 3A.

In FIG. 3C, the cross section through the tube joint 14 at the line B-B of FIG. 3A reveals the same arrangement of interface surfaces but the interface surfaces are between different parts than shown in FIG. 3B. In particular, a base portion 34 of the locking piece 18 has interface surfaces 52 that abut the lateral extensions 36 of the locking pieces 16 on both sides. The lateral pieces 36 of the locking pieces abut the projections 44 of the tube 12 at the interface surfaces 48. The other side is mirror symmetrical with the same arrangement of parts and interface surfaces. The locking piece 16 is not welded to tube 12 but is constrained from moving in the x and y directions by the angles of the radial mating surfaces between it and the parts 44 and 18. The locking piece 16 cannot move radially outwards or inwards due to the angles of the radial mating surfaces between it and the parts 18 and 44. The locking piece 16 is prevented from moving axially by the lateral shoulders and welds. As noted above, the radial mating surfaces distributed about the circumference of the tubular joint in conjunction with the lateral shoulders and the welded base portions constrain motion of the tubes at the tube joint.

Thus, it is possible with the present method and apparatus to join two tubes of the same diameter and same wall thickness end to end without deforming the tubes, without changing the wall thickness, without increasing the outside diameter or decreasing the inside diameter, and without requiring welding of the two tube materials to one another and without requiring brazing, soldering, gluing or the like. It is within the scope of the present invention that the tubes to be joined are of different wall thicknesses and/or different diameters and may be of the same or different materials.

Figure 4A:
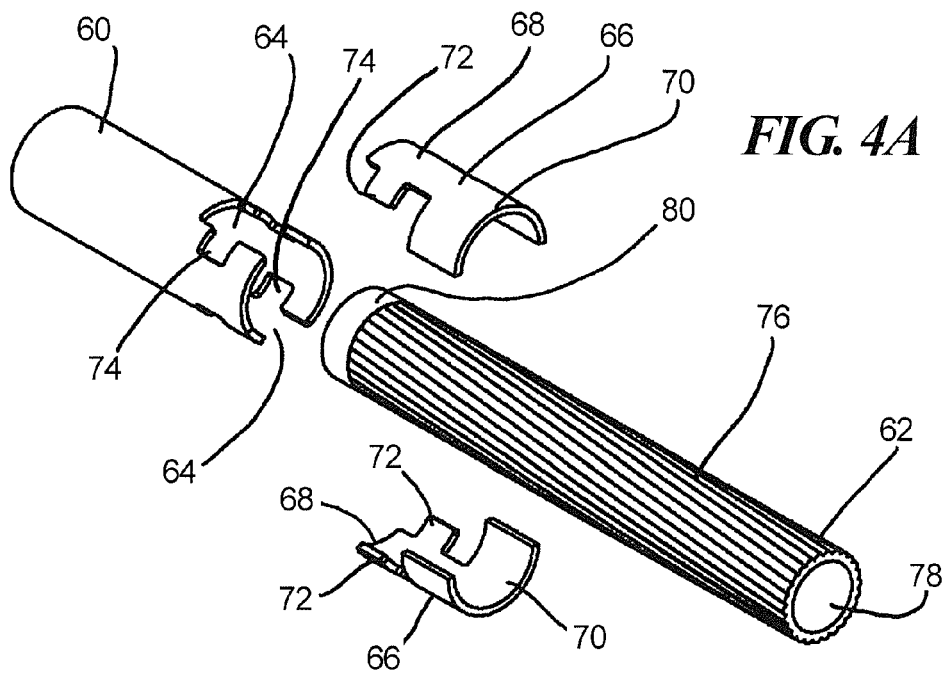
FIG. 4A is an exploded view showing parts for joining a tube to a cylinder according to an embodiment of the present invention.

An alternative embodiment of the present method and apparatus is shown in FIG. 4A. Instead of joining two tubes of the same diameter as described in the foregoing, a tube, or a generally tubular shaped piece or portion of a larger device such as a tool or other device 60 is to be joined to a tube or cylinder 62 of sufficiently smaller diameter to fit into the end of the tube 60. The tube 60 and the tube or cylinder 62 may be of the same material, but the advantages of the invention are realized when the two components are of different materials that are not easily or readily welded. In the illustrated example, the tube 60 is cut to define two cutouts 64. Other numbers of cutouts may be provided in other embodiments, such as one cutout, three cutouts or four cutouts, for example. Two locking pieces 66 are formed of a material that is readily welded to the tube or cylinder 62. The two locking pieces 66 are shaped each with an extension portion 68 that fits into the cutouts 64. The extension portion 68 is connected to a base portion 70. The locking pieces 66 are formed from a tube of substantially the same diameter as the tube 60 and of an interior diameter that fits over the outer diameter of the tube or cylinder 62.

The extension portion 68 of the locking pieces 66 include lateral extensions 72 that extend laterally from the extension portion 68. Corresponding lateral extensions 74 are formed in the cutouts 64. The lateral extensions 72 within the lateral extensions 74 of the cutouts resists tension or pulling on the tube joint to prevent the locking pieces 66 from being pulled from the tube 60. The locking pieces 66 are configured so that the radial surfaces of the axially directed cuts are arranged circumferentially and distributed in such a way as to constrain movement of the tube 60 relative to the tube 62 once the locking pieces 66 have been welded to the tube 62.

The tube or cylinder 62 of the illustrated embodiment is a cable formed of cable wires 76 around a hollow core 78, or the cable may be a solid cable of cable wires, or may have other forms and may include an end cap or weld 80 to prevent fraying. The cable 62 may be of steel and the tube 60 of nitinol so that welding the two components together is not readily or easily done. The locking pieces 66 are of steel so that they can be easily welded to the cable 62. It is also within the scope of the present invention that the tube 60 is of steel or other material and that the cylinder or cable 62 is of nitinol or other material. The cylinder or cable 62 may be solid or may be hollow. It is within the scope of the invention that a solid cylinder is affixed to the tube 60 in the manner shown.

Figure 4B:
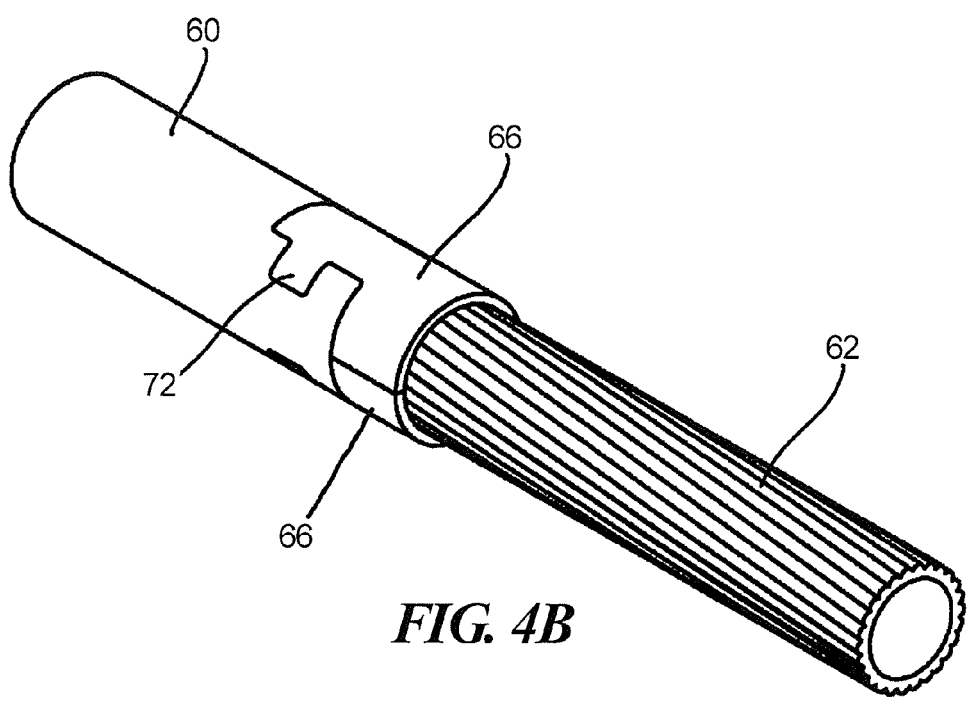
FIG. 4B is a perspective view of the joined tube and cylinder after assembly of the parts show in of FIG. 4A.

In FIG. 4B, the cable 62 has been inserted into the end of the tube 60. The locking pieces 66 are positioned with the extension portions 68 in the cutouts 64 of the tube 60 and the base portions 70 encircling the cable 62 at the end of the tube 60. The locking pieces 66 are welded to the cable 62, which is readily accomplished as the locking pieces 66 are of the same material or at least of a sufficiently similar material to the cable so that they are readily welded. By positioning the locking pieces 66 in the cutouts of the tube 60 and welding the locking pieces to the cable 62, the cable 62 is weld fastened to the tube 60 without the need to weld the tube 60 to the cable 62.

Figure 5A:
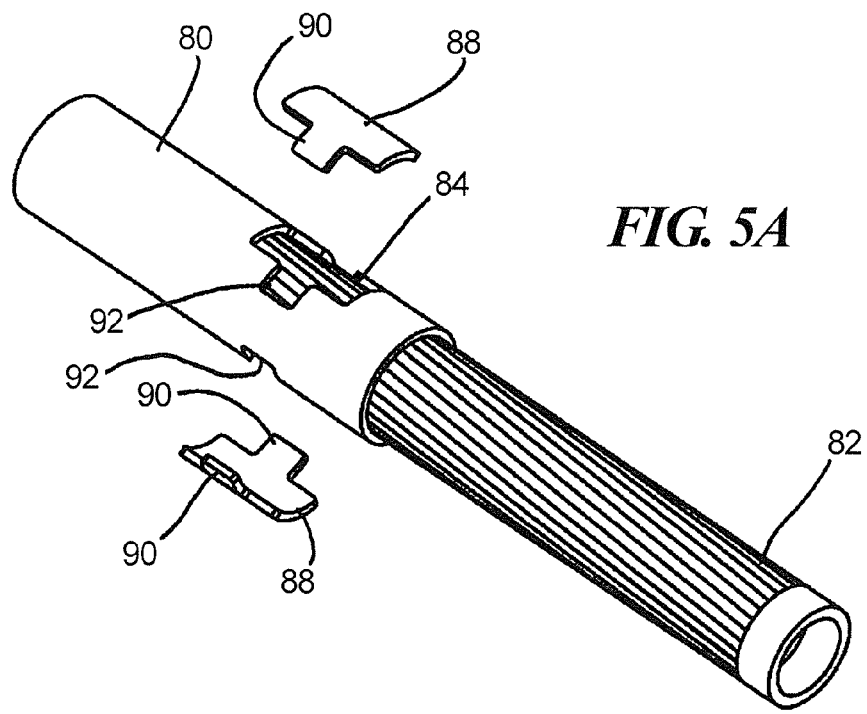
FIG. 5A is an exploded view showing the parts for joining a tube and a cylinder according to another embodiment of the present invention.

Referring to FIG. 5A, an alternate embodiment of an apparatus and method for attaching a tube 80 to a cylinder or tube 82 is shown. The cylinder or tube 82 in the illustration is a hollow cable. The tube 80 has cutouts 84 at one or more locations on the tube 80. The cylinder or tube 82 fits within the tube 80 so that it is accessible through the openings that result from the cutouts 84. The cutouts 84 in this embodiment are spaced from the end 86 of the tube 80 and the cutout 84 is enclosed by the tube wall rather than being open to the end as in the above-described embodiments.

Locking pieces 88 are prepared from a tube of material that is weld-compatible with the cable or cylinder 82 and shaped to fit into the cutouts 84. In the preferred embodiment, the cutouts 84 and the locking pieces 88 are provided with radial interface surfaces at the edges. The locking pieces 88 include lateral extensions 90 that fit within lateral extensions 92 of the cutouts 84. The lateral extensions provide additional radial mating surfaces at different circumferential locations to allow a wider distribution of mating surfaces around the circumference. The radial mating surfaces play a key role in joining the pieces to one another.

Figure 5B:
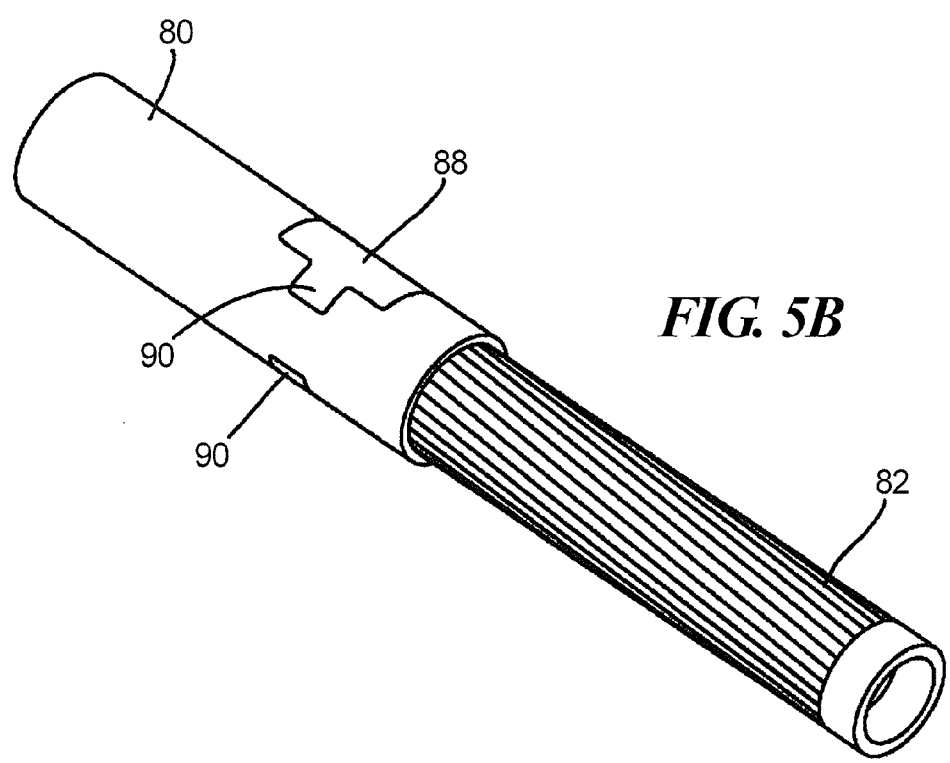
FIG. 5B is a perspective view of the joined tube and cylinder after assembly of the parts show in of FIG. 5A.

Referring to FIG. 5B, the locking pieces 88 have been placed into the cutouts 84 in the tube 80 and have been welded to the cable or cylinder 82. By virtue of the weld connection between the locking pieces 88 and the cable 82, the cable 82 is fastened in place in the tube 80 without being welded to the tube.

In the illustrated embodiments, a low profile, strong and reliable welded joint is provided between potentially incompatible materials without requiring the special welding techniques that would ordinarily be required of welding the incompatible materials.

Thus, there is shown and described an apparatus and method for joining two tubes of dissimilar material to one another in alignment with one another without increasing the outside diameter of the tubes or decreasing the inside diameter of the tubes. At least one locking piece formed of a material that is the same or substantially similar to a first of the tubes is provided in a cut-out at the end of the second tube and welded or otherwise secured or affixed to the first tube. The interlock of the locking piece in the second tube secures the first and second tubes together.

Two locking pieces of material of the first tube and two locking pieces of material of the second tube are positioned in an interlocking arrangement without welding or otherwise fastening the locking pieces to one another. The locking pieces of the material of the first tube are welded to the first tube. The locking pieces of the material of the second tube are welded to the second tube. The interlocked locking pieces secure the first and second tubes to one another without requiring welding of the dissimilar materials of the first and second tubes.

The present method and apparatus encompasses many possible arrangements of locking pieces. In the illustrated examples two locking pieces per material are provided, although three or four may be used. The two tubes are of the same or substantially the same inside and outside diameters but are of different materials, as a result of which it may not be possible to weld the two different materials to one another in a simple manner. Also in the illustrated examples two locking pieces are fit into cutouts in a tube and are welded to a second member of a different material and a different diameter so that the second member fits into the tube. The cutouts may extend to the end of the tube or be enclosed within the tube walls.

Welding of the similar or same material lock and tube components to one another is one possible method for attaching these components. Different types of welding techniques are being considered and are within the scope of the present invention. Other fastening techniques including brazing, gluing, ultrasonic welding, stamping, soldering and all other fastening techniques are encompassed here. The technique of cutting or forming the tube ends and locking elements encompass cutting by laser cutting, mechanical cutting, stamping, molding and all other forming and cutting techniques. The lock elements can be cut from the tube that they are to be fastened to, or may be formed or cut from another tube or other supply of material. A quantity of tubes may be shaped and a quantity of lock elements may be formed, and any of the lock elements joined to any of the tubes, such as might occur in a manufacturing line where parts are taken from a supply for assembly.

The tubes may be of metal, such as steel and other metal alloys, or may be of other materials including ceramic, plastic, carbon fibers or any other materials.

The solution allows a joint to be made with no increase in OD and no decrease in ID, allows dissimilar materials to be mechanically joined without requiring adhesive, weld, solder, braze or other between the dissimilar materials.

This method does not require an increase in OD or decrease in ID. Axial forces are carried by the interlocking shoulders of the interface surfaces. The geometry of the parts and the distribution of the radial cuts around the circumference lock the tubes together.

By arranging the mating surfaces at various angles, distributed over the circumference of the tubes, a joint is formed which will restrain relative movement between the tubes in all directions. The lock pieces fit together radially and axially and once welded into position to their respective tubes the joint is complete.

The locking pieces may be assembled together and held by heat-shrink or other method. In some instances it will be necessary to provide the additional support of a heat-shrink tube over the joined tubes but in other instances this may be unnecessary. The tubes are assembled onto the lock sub assembly.

The tubes may be lined, coated on interior and/or exterior surfaces, mounted within or around other structures, and/or may carry liquids, gases, semisolids or other materials. The interfaces between the interlocking elements may be sealed or left unsealed.

Other solutions may involve butt welding dissimilar materials, Niti (nitinol) to stainless steel for instance, gluing, lap or press fit joints.

Thus, there is shown and described a method and apparatus for joining tubes to one another or for joining a tube or a device or tool of generally tubular shape to another element such as a shaft or sleeve. The present method and apparatus allows a joint to be made between nitinol and stainless steel without having to make the difficult and potentially brittle niti to stainless steel weld. Locking pieces cut with appropriate geometry from both types of material are interlocked, constraining movement in most directions. Once this assembly is welded on to both tubes, the locking pieces of the first material welded to the tube of the first material and locking pieces of second material to tube of the second material, the parts are constrained from relative movement in all directions, thereby completing the joint.

Although other modifications and changes may be suggested by those skilled in the art, it is the intention of the inventors to embody within the patent warranted hereon all changes and modifications as reasonably and properly come within the scope of their contribution to the art.

We claim:

1. A tube joint joining a first tube to a second tube, comprising:
   a first tube and a second tube of equal outside diameter, the first tube and the second tube being of equal inside diameter;
   first locking pieces cut from a tube of a first material, said first locking pieces including lateral extensions, said first locking pieces include radial cut faces on all axially aligned portions of cut surfaces;
   second locking pieces cut from a tube of a second material, the second material being a different material than the first material, said second locking pieces including lateral extensions, said second locking pieces include radial cut faces on all axially aligned portions of cut surfaces;
   said first locking pieces and said second locking pieces arranged in interlocking relation with said lateral extensions of said respective first locking pieces engaging said lateral extensions of second locking pieces and with the radial cut faces of the first locking pieces and the radial cut faces of the second locking pieces distributed circumferentially around the joint so as to constrain relative movements between the parts;
   said first locking pieces being welded to said first tube by a first weld and said second locking pieces being welded to said second tube by a second weld, the first material not being welded to the second material;
   wherein the first tube is joined to the second tube at the tube joint, the tube joint being of the same outside diameter as the outside diameter of the first and second tubes, the tube joint being of the same inside diameter as the inside diameter of the first and second tubes so that the tube joint joins the first tube in end to end relation with the second tube without increasing a wall thickness at the tube joint; and
   wherein said first and second locking pieces are of substantially the same size and shape, said first and second locking pieces each having a base portion, the first weld connecting the base portion of the first locking piece to the first tube, the second weld connecting the base portion of the second locking piece to the second tube; the first and second locking pieces having lateral extensions extending from opposite sides of said base portion.

2. A tube joint as claimed in claim 1, wherein said first locking pieces are cut from a tube of a same material as said first tube, said second locking pieces being cut from a tube of the same material as said second tube.

3. A tube joint as claimed in claim 1, wherein said first locking pieces are two first locking pieces and wherein said second locking pieces are two second locking pieces.

4. A tube joint joining a first tube to a second tube, comprising:
   a first tube and a second tube of equal inside diameter and equal outside diameter;
   first locking pieces cut from a tube of a first material, said first locking pieces including lateral extensions, said first locking pieces include radial cut faces on all axially aligned portions of cut surfaces;
   second locking pieces cut from a tube of a second material, the second material being a different material than the first material said second locking pieces including lateral extensions, said second locking pieces include radial cut faces on all axially aligned portions of cut surfaces;
   said first locking pieces and said second locking pieces arranged in interlocking relation with said lateral extensions of said respective first locking pieces engaging said lateral extensions of second locking pieces and with the radial cut faces of the first locking pieces and the radial cut faces of the second locking pieces distributed circumferentially around the joint so as to constrain relative movements between the parts; and
   said first locking pieces being welded to said first tube by a first weld and said second locking pieces being welded to said second tube by a second weld, the first material not being welded to the second material;
   wherein the first tube is joined to the second tube at the tube joint, the tube joint being of the same inside diameter and outside diameter as the inside diameter and the outside diameter of the first and second tubes;
   wherein said first and second locking pieces are of substantially the same size and shape, said first and second locking pieces each having a base portion, the first weld connecting the base portion of the first locking piece to the first tube, the second weld connecting the base portion of the second locking piece to the second tube; the first and second locking pieces having lateral extensions extending from opposite sides of said base portion; and
   wherein the first tube and the second tube and the tube joint are configured for introduction into a lumen of a body of a living being for delivery of a medical device.

5. A tube joint joining a first tube to a second member, comprising:
   a first tube of a first material defining a shaped cutout, the first tube having an outside diameter;
   a second member of a second material different than said first material joined to said first tube;

at least one locking piece of a material that is welded to said second member so as to form a welded bond between the at least one locking piece and the second member, said at least one locking piece being fit into said shaped cutout in said first tube and being welded to said second member, the at least one locking piece fitting into the shaped cutout without extending beyond the outside diameter of the first tube, so that the tube joint is formed without increasing a diameter of the tube joint beyond the outside diameter of the first tube; and wherein said second member extends into said first tube so as to permit contact with the second member by a locking piece through said shaped cutout, and said at least one locking piece is only welded to said second member at a portion of said second member at said shaped cutout, said first material not being welded to said second material.

6. A tube joint as claimed in claim 5, wherein said cutout is closed off from an end of said first tube to which the second member is joined.

7. A tube joint as claimed in claim 5, wherein said cutout is open to an end of said first tube.

8. A tube joint as claimed in claim 5, wherein said second member is a cable.

9. A tube joint as claimed in claim 5, wherein the shaped cutout of said first tube is a first shaped cutout and further comprising a second shaped cutout, and said at least one locking piece comprises first and second locking pieces fit into respective ones of said first and second shaped cutouts.

10. A tube joint as claimed in claim 5, wherein said second member is a second tube of equal diameter to a diameter of said first tube, said first and second tubes being joined in end to end connection by the tube joint, the end to end connection joining the terminal ends of the first tube and the second tube to one another in abutting relation.

11. A tube joint as claimed in claim 10, wherein said at least one locking piece of a material that is welded to said second member is at least one second locking piece, and further comprising:

at least one first locking piece of a material that is welded to said first tube so as to form a welded bond between the material of the at least one first locking piece and the first tube;

said second tube defining a cutout shaped to accommodate said at least one first locking piece;

said at least one first locking piece being positioned in interlocked relation with said at least one second locking piece; and said at least one first locking piece being fit into said cutout of said second tube and welded to said first tube.

12. A tube joint as claimed in claim 11, wherein said at least one first locking piece includes two first locking pieces of a same material as said first tube;

said at least one second locking piece includes two second locking pieces of a same material as said second tube;

said first and second locking pieces being of substantially a same size and shape, said first and second locking pieces each including a base member welded to respective ones of said first and second tubes and lateral extensions, said lateral extensions of said first locking pieces being abutted against said lateral extensions of said second locking pieces.

\* \* \* \* \*